May 27, 1969      E. J. DEY      3,446,261
FASTENER STRIP
Filed July 27, 1967
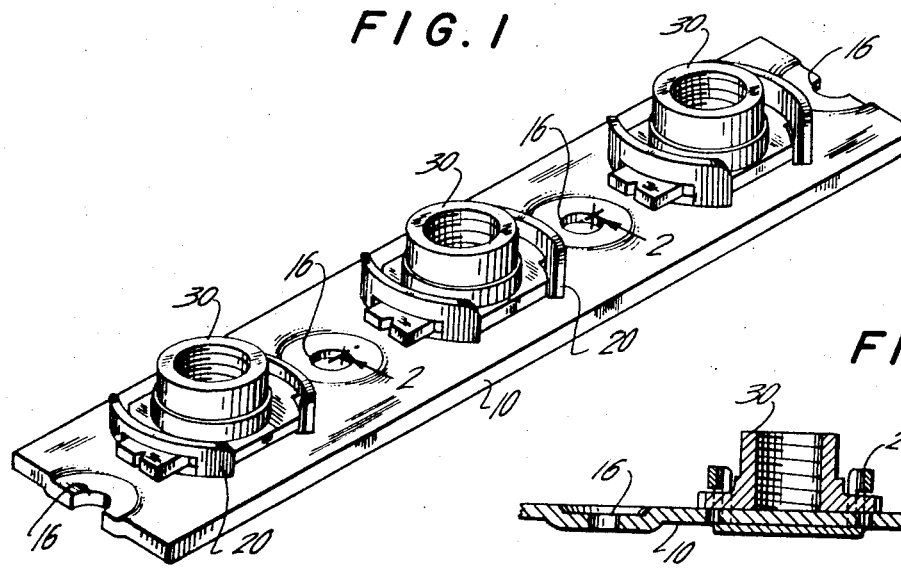
FIG. 1
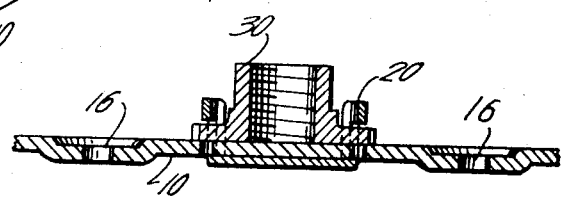
FIG. 2
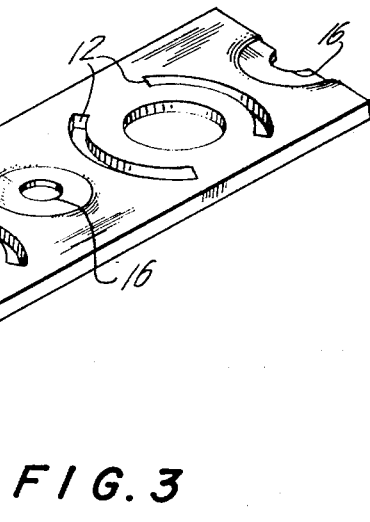
FIG. 3
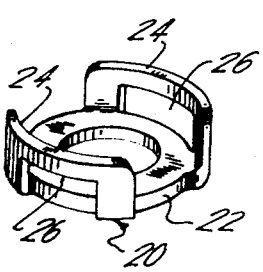
INVENTOR.
ERVIN J. DEY
BY *Andrew L. Vey*
ATTORNEY

United States Patent Office 3,446,261
Patented May 27, 1969

3,446,261
FASTENER STRIP
Ervin J. Dey, Santa Fe Springs, Calif., assignor to Standard Pressed Steel Co., Jenkintown, Pa., a corporation of Pennsylvania
Filed July 27, 1967, Ser. No. 656,579
Int. Cl. F16b 39/00
U.S. Cl. 151—41.71                   5 Claims

ABSTRACT OF THE DISCLOSURE

A fastener strip having a plurality of fasteners which are mounted by means of a plurality of retaining clips. The clips have bases which bear against one surface of the strip and slotted flanges which extend away from the bases and through correspondingly shaped slots in the strip. The slots in the flanges extend beyond the opposite surface of the strip and are arranged to receive lugs provided on the fasteners. As a result, the fasteners are held captive by the clips on the surface of the strip opposite from the one against which the bases of the clips bear.

---

The present invention relates, in general, to fastening devices and, in particular, to a unit having a floating fastener element which is permitted to undergo slight movements relative to a support component upon which the fastener element is mounted.

It is very difficult in the manufacture and assembly of large structures, such as airplane frames, to achieve exact alignment between mating fastener elements. In order to overcome this difficulty, floating fasteners are employed to accommodate slight misalignments between complementary fastener elements which are within prescribed tolerances.

It is an object of the present invention to provide a new and improved fastening device having one or more floating fastener elements.

It is another object of the present invention to provide such a fastening device in which the fastener elements may be either nuts or bolts.

It is a further object of the present invention to provide a fastener unit which is relatively simple in construction, inexpensive to fabricate and highly reliable in operation.

Briefly stated, a fastener strip constructed in accordance with the present invention includes a plurality of retaining clips spaced along a strip with each retaining clip having a base positioned to bear against one surface of the strip and a pair of curved slotted flanges extending away from the base and through correspondingly shaped slots in the strip. The slots in the flanges extend beyond the opposite surface of the strip. Also included is a plurality of fastener elements spaced along the strip with one fastener element associated with each of the retaining clips. Each of the fastener elements is positioned to bear against the opposite surface of the strip and has a body portion and a pair of lugs extending into the slots in the flanges of the associated retaining clip.

For a better understanding of the present invention, together with other and further objects thereof, reference is made to the following description, taken in connection with the accompanying drawing, and its scope will be pointed out in the appended claims.

Referring to the drawing:
FIGURE 1 is a perspective view of a fastener strip constructed in accordance with the present invention;
FIGURE 2 is a vertical section taken along line 2—2 of FIGURE 1; and
FIGURE 3 is an exploded perspective view of the fastener strip of FIGURE 1.

Referring to FIGURES 1 through 3, inclusive, a fastener strip constructed in accordance with the present invention includes a strip 10, a plurality of retaining clips 20 and a plurality of fasteners 30 in the form of nut elements. Strip 10 has a plurality of pairs of slots 12 spaced along the length thereof. The slots 12 are curved and are disposed generally transverse to the length of strip 10. An opening or clearance hole 14 is provided in strip 10 at each fastener location. The clearance holes are arranged to be in registration with the internal passage in the associated nut element 30 after the nut is mounted on the strip so that externally threaded fasteners may pass through the strip as they are received by the associated nuts. Strip 10 also is provided with mounting holes 16 by means of which the strip may be secured to a member upon which it is to be mounted.

One retaining clip 20 is associated with each pair of slots 12 in strip 10. Each of the retaining clips has a base 22 positioned to bear against one surface of strip 10 and a pair of slotted flanges 24 extending away from the base and through the associated pair of slots 12 in strip 10. Slots 26 in flanges 24 extend beyond the opposite surface of strip 10. Flanges 24 are curved to fit into slots 12 and are disposed generally transverse to the length of strip 10 when inserted into slots 12.

One nut element 30 is associated with each of the retaining clips 20 and each of the nuts is positioned to bear against that surface of strip 10 opposite from the one against which the base of the retaining clip bears. Each of the nuts 30 has an internally threaded body portion 32 and a pair of lugs 34. Lugs 34 are aligned and extend away from body portion 32 in opposite directions into slots 26 in flanges 24 of the retaining clips. With the bases 22 positioned to bear against one surface of strip 10 and the nuts 30 positioned to bear against the opposite surface of the strip and with the engagement of lugs 34 in slots 26 in flanges 24, the nuts 30 are retained on the strip. The dimensions of slots 12 and 26, lugs 34 and flanges 24 are such as to permit the desired degree of float of the nuts 30. If desired, the body portions of nuts 30 may be deformed elliptically to render them self-locking.

The fastener strip illustrated in FIGURE 1 is assembled in the following manner. Flanges 24 of the retaining clips are passed upward through slots 12 in strip 10. Next, lugs 34 of nut elements 30 are inserted into the associated slots 26 in flanges 24 by means of force fits. In particular, one lug of each nut element is introduced into one slot 26, while the other lug snaps into the other slot 26 as downward force is applied to the nut element.

While there has been described what is at present considered to be the preferred embodiment of this invention, it will be obvious to those skilled in the art that various changes and modifications may be made therein without departing from the invention and it is, therefore, aimed to cover all such changes and modifications as fall within the true spirit and scope of the invention. For example, while nut elements have been described as the fasteners mounted on the strip, bolt elements also may be employed.

What is claimed is:
1. A fastener strip comprising:
   a strip having a plurality of pairs of curved slots spaced along the length thereof and disposed generally transverse to the length of said strip;
   a plurality of retaining clips spaced along said strip, one retaining clip associated with each pair of said slots in said strip and each of said retaining clips having a base positioned to bear against one surface of said strip and a pair of curved slotted flanges extending away from said base and through an asscociated pair of curved slots in said strip, the slots in said flanges extending beyond the opposite surface of said strip;

and a plurality of fastener elements spaced along said strip, one fastener element associated with each of said retaining clips and each of said fastener elements positioned to bear against said opposite surface of said strip and having a body portion and a pair of lugs extending into said slots in said flanges of one of said retaining clips.

2. A fastener strip according to claim 1 wherein said lugs on each fastener are aligned and extend away from said body portion of said fastener in opposite directions.

3. A fastener strip according to claim 1 wherein said fastener elements are nut elements and said strip is provided with clearance holes in registration with the internal passages of said nut elements, whereby externally threaded fasteners may pass through said strip when said externally threaded fasteners are received by said nut elements.

4. A fastener strip according to claim 1 wherein said strip is provided with a series of holes adapted for mounting said strip upon a member.

5. A fastener strip according to claim 1 wherein clearance is provided between said flanges and said curved slots in said strip and between said lugs and said slots in said flanges, whereby said fastener elements may float relative to said strip.

References Cited

UNITED STATES PATENTS

| | | | |
|---|---|---|---|
| 1,931,011 | 10/1933 | Richardson et al. | 151—41.74 |
| 2,243,923 | 6/1941 | Swanstrom | 151—41.76 |
| 2,330,372 | 9/1943 | Mittendorf | 151—41.75 |
| 2,455,145 | 11/1948 | Swanstrom | 151—41.76 |
| 2,815,789 | 12/1957 | Hutson et al. | 151—41.7 |
| 3,123,120 | 3/1964 | Grimm et al. | 151—41.7 |

FOREIGN PATENTS

| | | |
|---|---|---|
| 545,898 | 6/1942 | Great Britain. |
| 997,596 | 7/1965 | Great Britain. |

MARION PARSONS, JR., *Primary Examiner.*